(12) United States Patent
Nguyen et al.

(10) Patent No.: US 12,248,795 B2
(45) Date of Patent: Mar. 11, 2025

(54) CLOUD INFRASTRUCTURE MANAGEMENT

(71) Applicant: Google LLC, Mountain View, CA (US)

(72) Inventors: Vu Nguyen, Mountain View, CA (US); Chen Li, Mountain View, CA (US); Katherine Huang, Mountain View, CA (US); Gongpu Zhu, Mountain View, CA (US); Zewen Li, Mountain View, CA (US); Javier Kohen, Mountain View, CA (US)

(73) Assignee: Google LLC, Mountain View, CA (US)

( * ) Notice: Subject to any disclaimer, the term of this patent is extended or adjusted under 35 U.S.C. 154(b) by 124 days.

(21) Appl. No.: 18/064,326

(22) Filed: Dec. 12, 2022

(65) Prior Publication Data
US 2023/0409346 A1    Dec. 21, 2023

Related U.S. Application Data

(60) Provisional application No. 63/366,659, filed on Jun. 20, 2022.

(51) Int. Cl.
| | | |
|---|---|---|
| *H04L 41/022* | (2022.01) | |
| *G06F 9/451* | (2018.01) | |
| *H04L 41/0803* | (2022.01) | |

(52) U.S. Cl.
CPC ............ *G06F 9/451* (2018.02); *H04L 41/022* (2013.01); *H04L 41/0803* (2013.01)

(58) Field of Classification Search
CPC .......................... H04L 41/022; H04L 41/0803
See application file for complete search history.

(56) References Cited

U.S. PATENT DOCUMENTS

| | | | | |
|---|---|---|---|---|
| 2017/0041192 | A1* | 2/2017 | Walls | ................. H04L 41/0806 |
| 2017/0041198 | A1* | 2/2017 | Walls | ................. H04L 41/5051 |
| 2017/0063615 | A1* | 3/2017 | Yang | ....................... H04L 67/62 |
| 2019/0140894 | A1* | 5/2019 | Gujarathi | ............... H04L 67/10 |

(Continued)

OTHER PUBLICATIONS

International Search Report and Written Opinion for the related Application No. PCT/US2023/025657, dated Sep. 22, 2023, 19 pages.

(Continued)

*Primary Examiner* — Minh Chau Nguyen
(74) *Attorney, Agent, or Firm* — Honigman LLP; Brett A. Krueger

(57) ABSTRACT

A method for managing cloud infrastructure includes receiving, from a user of a user device, a cloud infrastructure modification request requesting modification to cloud infrastructure. The cloud infrastructure modification request includes abstract configuration data derived from a user interaction with a graphical user interface (GUI) executing on the user device. The method includes translating the abstract configuration data into a configuration command. The configuration command describes a configuration of the cloud infrastructure. The method includes updating a configuration file with the configuration command. The configuration file includes one or more cloud infrastructure specifications for the cloud infrastructure and is controlled by a source control management system. The method includes provisioning, using the updated configuration file, the cloud infrastructure.

24 Claims, 8 Drawing Sheets

(56) References Cited

U.S. PATENT DOCUMENTS

2020/0257554 A1* 8/2020 Okuno ................. G06F 9/5077
2021/0111949 A1* 4/2021 Collins ................ G06F 9/5072

OTHER PUBLICATIONS

Burns Brendan et al.: "Kubernetes Up & Running", Oct. 4, 2019 (Oct. 4, 2019), XP055921130, Retrieved from the Internet: URL:https://www.vmware. com/content/dam/digitalmarketing/vmware/en/pdf/docs/vmware-kubernetes-up-running-dive-into- the-future-of-infrastructure.pdf [retrieved on May 13, 2022], p. 4, p. 37, p. 196, p. 222-p. 223, 5 pages.

* cited by examiner

CLOUD INFRASTRUCTURE MANAGEMENT

CROSS REFERENCE TO RELATED APPLICATIONS

This U.S. patent application is a continuation of, and claims priority under 35 U.S.C. § 119(e) to U.S. Provisional Application 63/366,659, filed on Jun. 20, 2022. The disclosure of this prior application is considered part of the disclosure of this application and is hereby incorporated by reference in its entirety.

TECHNICAL FIELD

This disclosure relates to cloud infrastructure management.

BACKGROUND

Infrastructure as code (IaC) enables developers or operations teams to automatically manage, monitor and provision resources, rather than manually configure cloud resources. Infrastructure as code is sometimes referred to as programmable or software-defined infrastructure. The configuration state/manifest files are stored and version-controlled in a source control management (SCM) such as Gitlab and may be referred to as git operation (i.e., GitOps). Conventional user interfaces (UI) for cloud infrastructure management typically enable developers or operations teams to manually manage, monitor and configure cloud resources, which may be referred to as click operations (i.e., ClickOps). These click operations and the UI are an effective method for manually managing cloud resources.

SUMMARY

One aspect of the disclosure provides a computer-implemented method executed by data processing hardware that causes the data processing hardware to perform operations for managing cloud infrastructure. The operations include receiving, from a user of a user device, a cloud infrastructure modification request requesting modification to cloud infrastructure executing on the data processing hardware. The cloud infrastructure modification request includes abstract configuration data derived from a user interaction with a graphical user interface (GUI). The operations include translating the abstract configuration data into a configuration command. The configuration command describes a configuration of the cloud infrastructure. The operations include updating a configuration file with the configuration command. The operations include provisioning, using the updated configuration file, the cloud infrastructure.

Implementations of the disclosure may include one or more of the following optional features. In some implementations, the operations further include, after updating the configuration file with the configuration command, generating an approval request requesting approval of the update to the configuration file from a second user of a second user device, and prior to provisioning the cloud infrastructure, receiving, from the second user device, an approval response approving the update to the configuration file. In some of these implementations, the operations further include receiving, from the user of the user device, a second cloud infrastructure modification request requesting modification to the cloud infrastructure where the second cloud infrastructure modification request includes second abstract configuration data derived from a second user interaction with the GUI executing on the user device; translating the second abstract configuration data into a second configuration command; updating the configuration file with the second configuration command; generating a second approval request requesting approval of the update to the configuration file from the second user of the second user device; receiving, from the second user device, a rejection response rejecting the update to the configuration file; and transmitting, to the user device, a notification including the rejection response. In some of these implementations, the operations further include receiving, from the user of the user device, a second cloud infrastructure modification request requesting modification to the cloud infrastructure, the second cloud infrastructure modification request including second abstract configuration data derived from a second user interaction with the GUI executing on the user device; translating the second abstract configuration data into second configuration command; determining a merge conflict between the second configuration command and existing configuration commands of the configuration file; and transmitting, to the user device, a notification including the merge conflict. In some of these implementations, the approval request includes a difference between the configuration file prior to updating and the configuration file after updating.

In some examples, the operations further include, prior to updating the configuration file with the configuration command, retrieving the configuration file from the source control management system. In some of these examples, updating the configuration file includes merging the configuration command with the configuration file using the source control management system.

Optionally, after provisioning the cloud infrastructure, the operations further include receiving, from a second user of a second user device, updated configuration commands; updating the configuration file with the updated configuration commands; provisioning, using the configuration file, the cloud infrastructure; and sending, to the user device, a GUI update command. The GUI update command, when executed by the user device, causes the user device to display, on the GUI executing on the user device, visual elements representing the updated configuration commands. In some of these examples, the updated configuration commands are derived from updates the second user made to a copy of the configuration file stored at the second user device. The configuration file may include Infrastructure as Code (IaC). In some examples, the GUI executes on the user device. Optionally, the configuration file includes one or more cloud infrastructure specifications for the cloud infrastructure and is controlled by a source control management system.

Another aspect of the disclosure provides a system for managing cloud infrastructure. The system includes data processing hardware and memory hardware in communication with the data processing hardware. The memory hardware stores instructions that when executed on the data processing hardware cause the data processing hardware to perform operations. The operations include receiving, from a user of a user device, a cloud infrastructure modification request requesting modification to cloud infrastructure executing on the data processing hardware. The cloud infrastructure modification request includes abstract configuration data derived from a user interaction with a graphical user interface (GUI). The operations include translating the abstract configuration data into a configuration command. The configuration command describes a configuration of the cloud infrastructure. The operations include updating a configuration file with the configuration command. The operations include provisioning, using the updated configuration file, the cloud infrastructure.

This aspect may include one or more of the following optional features. In some implementations, the operations further include, after updating the configuration file with the configuration command, generating an approval request requesting approval of the update to the configuration file from a second user of a second user device, and prior to provisioning the cloud infrastructure, receiving, from the second user device, an approval response approving the update to the configuration file. In some of these implementations, the operations further include receiving, from the user of the user device, a second cloud infrastructure modification request requesting modification to the cloud infrastructure where the second cloud infrastructure modification request includes second abstract configuration data derived from a second user interaction with the GUI executing on the user device; translating the second abstract configuration data into a second configuration command; updating the configuration file with the second configuration command; generating a second approval request requesting approval of the update to the configuration file from the second user of the second user device; receiving, from the second user device, a rejection response rejecting the update to the configuration file; and transmitting, to the user device, a notification including the rejection response. In some of these implementations, the operations further include receiving, from the user of the user device, a second cloud infrastructure modification request requesting modification to the cloud infrastructure, the second cloud infrastructure modification request including second abstract configuration data derived from a second user interaction with the GUI executing on the user device; translating the second abstract configuration data into second configuration command; determining a merge conflict between the second configuration command and existing configuration commands of the configuration file; and transmitting, to the user device, a notification including the merge conflict. In some of these implementations, the approval request includes a difference between the configuration file prior to updating and the configuration file after updating.

In some examples, the operations further include, prior to updating the configuration file with the configuration command, retrieving the configuration file from the source control management system. In some of these examples, updating the configuration file includes merging the configuration command with the configuration file using the source control management system.

Optionally, after provisioning the cloud infrastructure, the operations further include receiving, from a second user of a second user device, updated configuration commands; updating the configuration file with the updated configuration commands; provisioning, using the configuration file, the cloud infrastructure; and sending, to the user device, a GUI update command. The GUI update command, when executed by the user device, causes the user device to display, on the GUI executing on the user device, visual elements representing the updated configuration commands. In some of these examples, the updated configuration commands are derived from updates the second user made to a copy of the configuration file stored at the second user device. The configuration file may include Infrastructure as Code (IaC). In some examples, the GUI executes on the user device. Optionally, the configuration file includes one or more cloud infrastructure specifications for the cloud infrastructure and is controlled by a source control management system.

The details of one or more implementations of the disclosure are set forth in the accompanying drawings and the description below. Other aspects, features, and advantages will be apparent from the description and drawings, and from the claims.

DESCRIPTION OF DRAWINGS

Like reference symbols in the various drawings indicate like elements.

DETAILED DESCRIPTION

Infrastructure as code (IaC) enables developers or operations teams to automatically manage, monitor and provision resources, rather than manually configure cloud resources. Infrastructure as code is sometimes referred to as programmable or software-defined infrastructure. The configuration state/manifest files are stored and version-controlled in a source control management (SCM) such as Gitlab and may be referred to as git operation (i.e., GitOps). Conventional user interfaces (UI) for cloud infrastructure management typically enable developers or operations teams to manually manage, monitor and configure cloud resources, which may be referred to as click operations (i.e., ClickOps). These click operations and the UI are an effective method for manually managing cloud resources. However, to manage cloud resources at scale and to automate the deployment process, IaC is generally more desired and is thus the common practice for the modern software industry. Conventionally IaC and UIs are two different tracks and are not interoperable. Therefore to achieve IaC, customers typically must invest in a software engineering team to implement IaC using technology, which is both expensive and time consuming.

Implementations herein include a system that provides an interoperable model between ClickOps and GitOps. They system also provides a mechanism for clients or customers to achieve IaC without investing in a software engineer team. The system receives user interactions from a graphical user interface (GUI) executing on a user device and translates the user actions into configuration commands. The system generates or updates configuration files with the configuration commands and, using the configuration files, provisions or deploys cloud infrastructure. The system interfaces with a source control management system (SCMS) to provide robust approval and version control functionality without requiring users to interact with configuration files directly.

Figure 1:
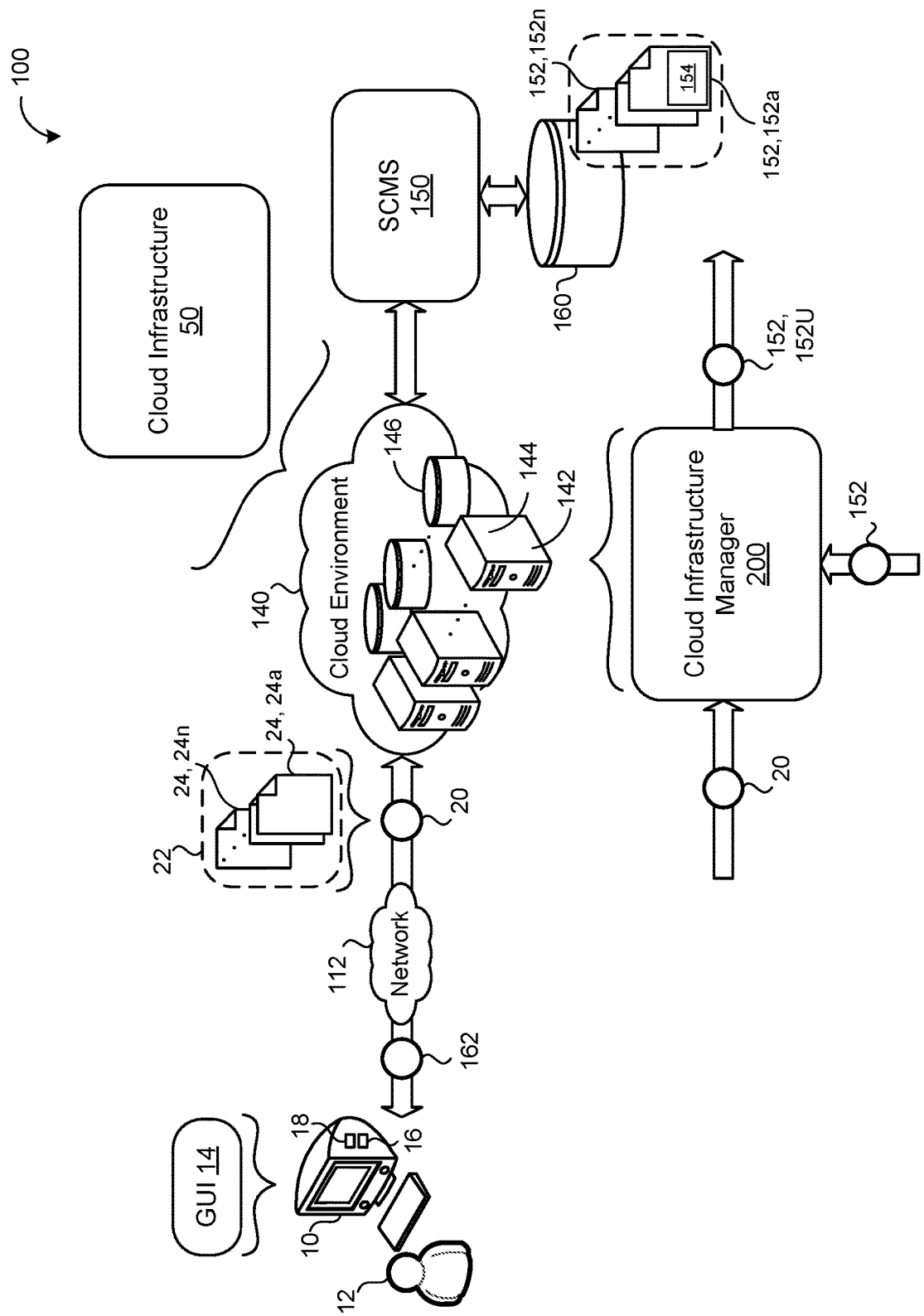
FIG. 1 is a schematic view of an example system for managing cloud infrastructure.

Referring to FIG. 1, in some implementations, a system 100 for managing cloud infrastructure 50 includes a remote system 140 in communication with one or more user devices 10 via a network 112. The remote system 140 may be a single computer, multiple computers, or a distributed system (e.g., a cloud environment) having scalable/elastic resources 142 including computing resources 144 (e.g., data processing hardware) and/or storage resources 146 (e.g., memory hardware). A data store (i.e., a remote storage device) may be overlain on the storage resources 146 to allow scalable use of the storage resources 146 by one or more of the clients (e.g., the user device 10) or the computing resources 144. The remote system 140 may execute the cloud infrastructure 50 and/or be in communication with the cloud infrastructure 50.

The remote system 140 includes and/or is in communication with a source control management system (SCMS) 150. The SCMS 150 provides version control (i.e., revision control, source control, source code management, etc.) of one or more configuration files 152, 152*a-n*. The configuration files 152 define the deployment and/or provisioning of the cloud infrastructure 50. The configuration files 152 may include IaC and/or one or more cloud infrastructure specifications 154 (i.e., specifying the deployment/provisioning of the cloud infrastructure 50). The SCMS 150 may interact with a data store 160 to store, manage, and maintain the configuration files 152.

The remote system 140 is configured to receive a cloud infrastructure modification request 20 from a user device 10 associated with a respective user 12 via, for example, the network 112. The user device 10 may correspond to any computing device, such as a desktop workstation, a laptop workstation, or a mobile device (i.e., a smart phone). The user device 10 includes computing resources 18 (e.g., data processing hardware) and/or storage resources 16 (e.g., memory hardware). The user 12 may construct the modification request 20 using a graphical user interface (GUI) 14 executing on the user device 10. The modification request 20 requests the remote system 140 generate and/or update one or more configuration files 152, 152*a-n* stored at memory in communication with the remote system (e.g., at the data store). The modification request 20 may include abstract configuration data 22 derived from user interactions 24, 24*a-n* with the GUI 14 executing on the user device 10. For example, the user 12 interacts with the GUI 14 by adjusting sliders, selecting buttons, entering text boxes, etc. The interactions represent intent by the user 12 to modify configuration or deployment of the cloud infrastructure 50. For example, the abstract configuration data 22, via the one or more user interactions 24, indicates that the user 12 requests to change a size of a deployment of the cloud infrastructure 50. Notably, the abstract configuration data 22 is at a higher level (i.e., more abstract) than the traditional cloud infrastructure configuration commands. For example, the GUI 14 may provide a "no-code" environment to allow the user 12 to configure the cloud infrastructure 50 without requiring the technical skills required for low-level code generation or adjustment.

Figure 2:
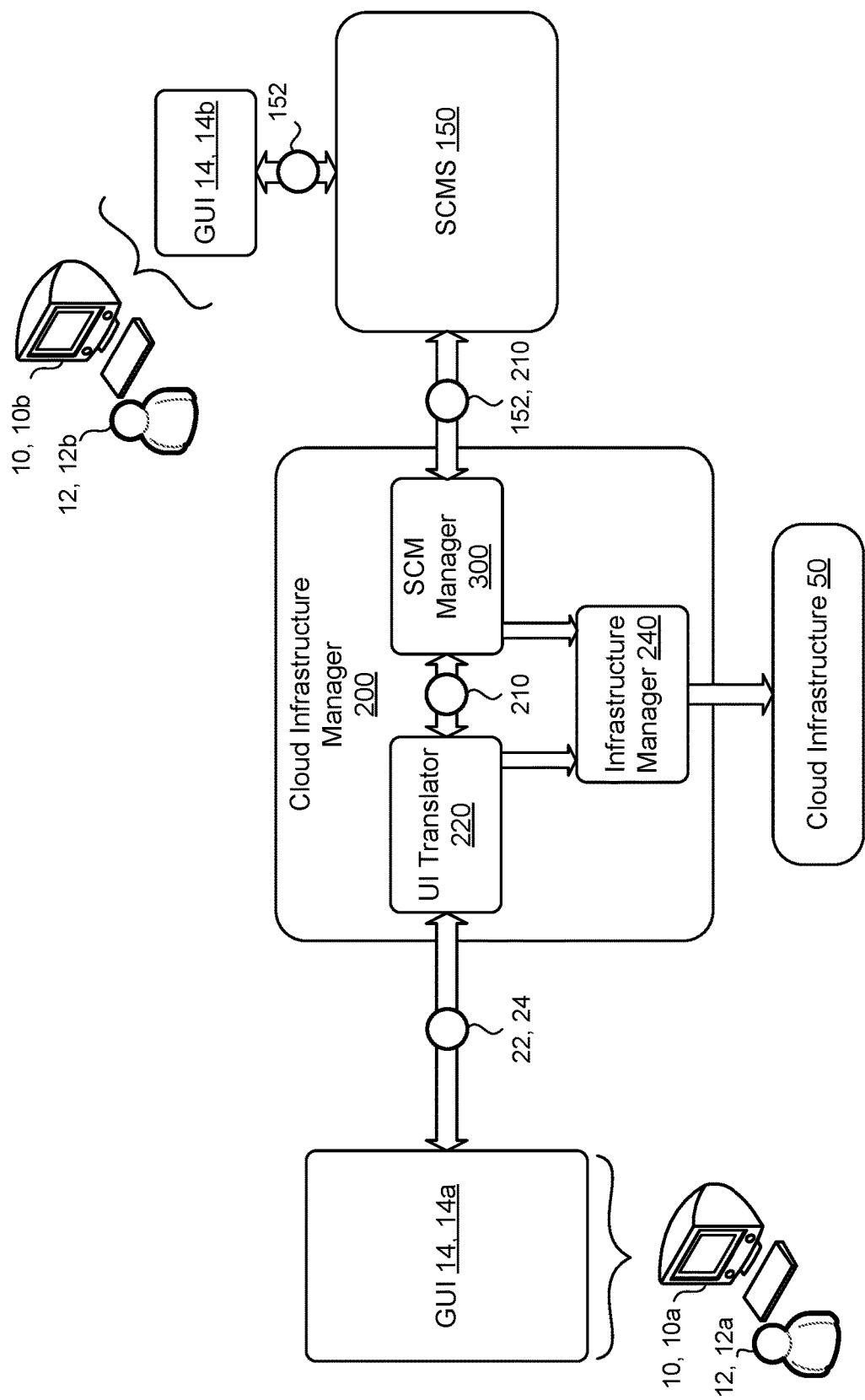
FIG. 2 is a schematic view of exemplary components of the system of FIG. 1.

The remote system 140 executes a cloud infrastructure manager 200 that receives the modification request 20. The cloud infrastructure manager 200 translates the abstract configuration data 22 into one or more configuration commands 210 (FIG. 2). The cloud infrastructure manager 200 updates a configuration file 152 (e.g., retrieved from the SCMS 150) with the translated configuration commands 210. The configuration files 152 represent low-level "source" code that includes the configuration commands 210 required to configure and/or provision the cloud infrastructure 50. For example, the configuration files 152 include YAML configuration files. Thus, the cloud infrastructure manager 200 translates abstract, "high-level" intentions from the user 12 (i.e., the user interactions 24 when interacting with the GUI 14) into "low-level" configuration files 152. This allows the user 12 to modify or request modification to the cloud infrastructure 50 without requiring the technical knowledge necessary to directly generate the configuration files 152. The cloud infrastructure manager 200 may provision, using the updated configuration file 152, 152U, the cloud infrastructure 50. For example, the updated configuration file 152 changes a deployment size of the cloud infrastructure 50.

Referring now to FIG. 2, in some implementations, the cloud infrastructure manager 200 includes a UI translator 220. The UI translator 220 receives the abstract configuration data 22 derived from the user interactions 24. For example, a first user 12, 12*a* interacts, using a first user device 10, 10*a*, with a first GUI 14, 14*a*. The user device 10 may transmit these user interactions 24 (e.g., interactions generated by the user 12*a* interacting with the GUI 14*a* via a mouse, keyboard, touch, voice, etc.) to the UI translator 220 as the abstract configuration data 22 derived from the user interactions 24.

The UI translator 220 translates the abstract configuration data 22 into one or more configuration commands 210. For example, the UI translator 220 uses a lookup table, a machine learning algorithm, or other models to generate, from the abstract configuration data, the configuration commands 210. The configuration commands 210 represent the "low-level" code required to implement the additions or changes to the cloud infrastructure 50 the user 12 requested via the user interactions 24.

An SCM manager 300, in some examples, receives the configuration commands 210 from the UI translator 220. The SCM manager 300 is in communication with the SCMS 150. The SCM manager 300 retrieves any appropriate configuration files 152 from the SCMS 150 that the configuration commands 210 may update. For example, when the configuration commands 210 modify or add a cloud infrastructure specification 154 of an existing configuration file 152, the SCM manager 300, prior to updating the configuration file 152, retrieves the configuration file from the SCMS 150. In other examples, the SCM manager 300 generates a new configuration file 152 (e.g., when the configuration commands 210 do not modify an already existing configuration file 152 but instead require an entirely new configuration file 152). The SCM manager 300 updates the retrieved configuration file 152 with the configuration commands 210 received from the UI translator 220. Updating the configuration file 152, in some examples, includes merging the configuration commands 210 with the configuration file 152. Merging the configuration commands 210 may include adding new lines, deleting lines, and/or modifying existing lines, based on the configuration commands 210 and existing lines within the configuration file 152. In some examples, the SCM manager 300 merges the configuration commands 210 using the SCMS 150. For example, the SCM manager 300 sends a merge command to the SCMS 150.

In some implementations, users 12 interact directly with the SCMS 150 to "manually" add, remove, or edit the configuration files 152. For example, a second user 12, 12*b*, using a second user device 10, 10*b*, interacts with a second GUI 14, 14*b* that communicates directly with the SCMS 150 or directly via the cloud infrastructure manager 200. In this case, the second user 12*b* interacts directly with the "low-level" code by, for example, directly modifying the configuration files 152 in a text editor or other development environment (e.g., executing at least partially locally on the second user device 10b). The SCM manager 300 may receive updated configuration commands 210 derived from updates the second user 12b made to a copy of the configuration file 152 at the second user device 10b. For example, the SCM manager 300 receives these manual updates to the configuration files 152 from the SCMS 150 by the SCMS 150 "pushing" the changes or the SCM manager 300 "pulling" the changes). The SCM manager 300 may provide the changes (e.g., using configuration commands 210) to the UI translator 220. The UI translator 220 may translate the configuration commands 210 generated by the second user 12b into abstract configuration data 22. The first GUI 14a may receive the abstract configuration data (e.g., via a GUI update command) from the UI translator 220 and update the GUI 14a to reflect the changes propagated by the second user 12b. That is, the first user 12a may observe visual elements of the GUI 14 that reflect or represent the changes to the configuration files 152 generated by the second user 12b via the first GUI 14a, with the visual elements displayed in an abstract manner (i.e., in a manner more abstract the low-level code of the configuration files 152).

In this way, the cloud infrastructure manager 200 allows users 12 of both the first GUI 14a (i.e., the abstract or "high-level" representation of the configuration files 152) and the second GUI 15b (i.e., the "low-level" representation of the configuration files 152) to cooperate and coexist. The cloud infrastructure manager 200 may update or provision the cloud infrastructure 50 based on the updates made to the configuration files 152 by the second user 12b.

In some implementations, the cloud infrastructure manager 200 includes an infrastructure manager 240. The infrastructure manager 240 communicates with the UI translator 220 and/or the SCM manager 300 using the configuration commands 210 and/or the configuration files 152 to provision the cloud infrastructure 50. That is, as changes to the configuration files 152 (from either abstract configuration data 22 or from direct modification of the configuration files 152) demand corresponding changes to the cloud infrastructure 50 (i.e., configuration of various cloud infrastructure elements, such as servers, load balancers, virtual machines, etc.), the infrastructure manager 240 interacts with the cloud infrastructure 50 to make the necessary changes.

Figure 3:
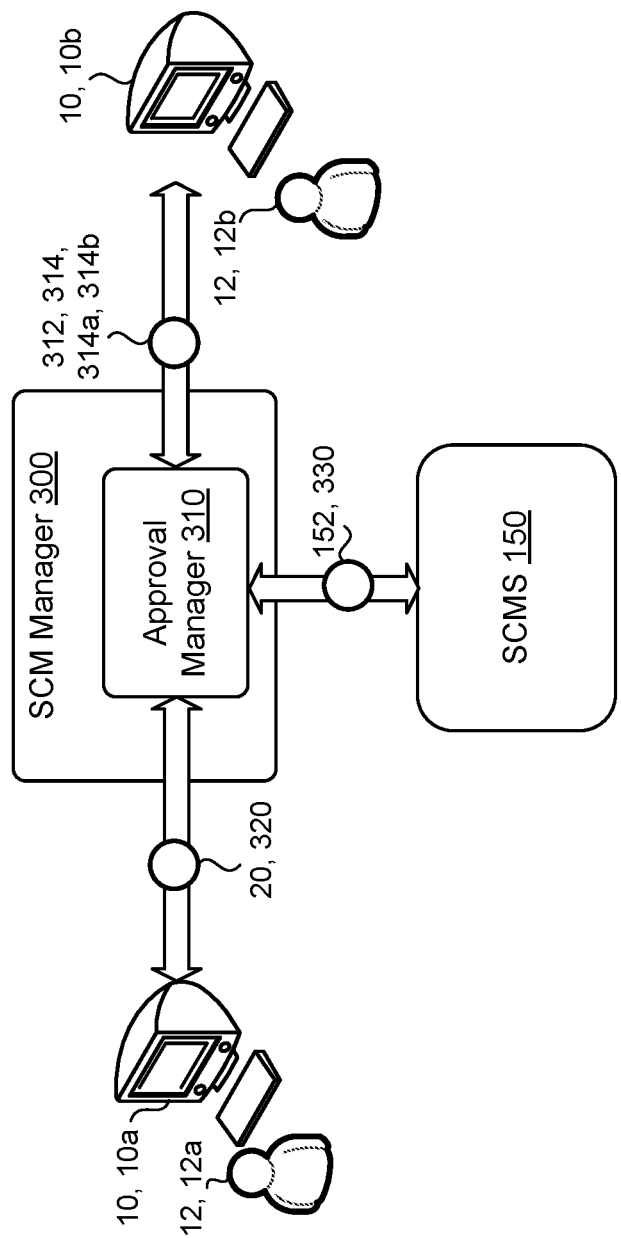
FIG. 3 is a schematic view of an approval manager for generating approval requests.

Referring now to FIG. 3, in some implementations, the SCM manager 300 includes an approval manager 310. The approval manager 310 generates approval requests 312 requesting approval of updates or additions of configuration files 152 prior to committing the updates or additions to the SCMS 150. For example, when the first user 12a generates a modification request 20 requesting modification to a configuration file 152 (FIGS. 1 and 2), the approval manager 310 generates an approval request 312 requesting approval of the modification to the configuration file 152 from the second user 12b. Prior to provisioning the cloud infrastructure 50, the approval manager 310 receives, from the second user 12b, an approval response 314, 314a approving the modification to the configuration file 152. In other examples, the approval manager 310 receives, from the second user device 10b, a rejection response 314, 314b rejecting the modification to the configuration file 152. In these examples, the approval manager 310 transmits, to the first user device 10a (i.e., to the user 12a that generated the modification request 20) a notification 320 including the rejection response 314b or otherwise notifying the user 12a of the rejection.

The approval manager 310 may generate the approval requests 312 for each approver of a modification request 20. The approval manager 310 may determine the appropriate approvers for a modification request 20 based on a number of factors. For example, the modification request 20 may reference one or more approvers. In another example, the approval manager 310 may select an owner or other responsible party of the configuration file 152 as an approver. In yet other examples, the approval manager 310 may determine the approvers from predetermined lists (e.g., an administrator), based on the requester, based on the scope of the modification request 20, etc. The approval manager 310 may always generate approval requests 312 (i.e., updates or additions to the configuration files 152 always require approval) or only a portion of modification requests 20 may require approval (e.g., addition of new configuration files 152 do not require approval while modification of existing configuration files 152 requires approval).

In some examples, the SCM manager 300 determines whether a merge conflict 330 exists between the new configuration commands 210 (e.g., generated from the modification request 20) and any existing configuration commands 210 of the configuration file 152. A merge conflict 330 arises when a proposed change to a configuration file 152 is in some way incompatible with the version of the configuration file 152 to be updated. For example, when configuration commands 210 alter a deployment size of a deployment that does not exist in the configuration file 152 (e.g., because a previous modification removed the deployment), a merge conflict 330 arises. The approval manager 310 may determine whether a merge conflict 330 exists based on communications with the SCMS 150. That is, in some implementations, the SCM manager 300 determines the merge conflict 330 (e.g., by analyzing the new configuration commands 210 and the existing configuration file 152) or the SCM manager 300 relies on the SCMS 150 to determine whether any merge conflicts 330 exist (e.g., by performing a "dry-run" or testing a commit to the SCMS 150). In some examples, the SCM manager 300 determines whether any merge conflicts 330 are present prior to generating any approval requests 312. In these examples, the SCM manager 300 may transmit to the user 12 generating the modification request 20, a notification 320 notifying the user 12 of the merge conflict 330. The user 12 may be required to correct the merge conflict 330 prior to seeking approval of the modifications.

The merge conflicts 330, in some implementations, only reflect conflicts that would cause an invalid configuration file 152. In other implementations, merge conflicts 330 extend to valid, but undesirable configurations. For example, an organization may impose specific rules or restrictions (e.g., a maximum deployment size, a maximum cost, etc.). The SCM manager 300 may flag violation of a rule or restriction as a merge conflict 330 that requires correction. In some examples, the SCM manager 300 generates the approval request(s) 312 when merge conflicts 330 are present and notifies the approvers of the merge conflict 330.

Figure 4A:
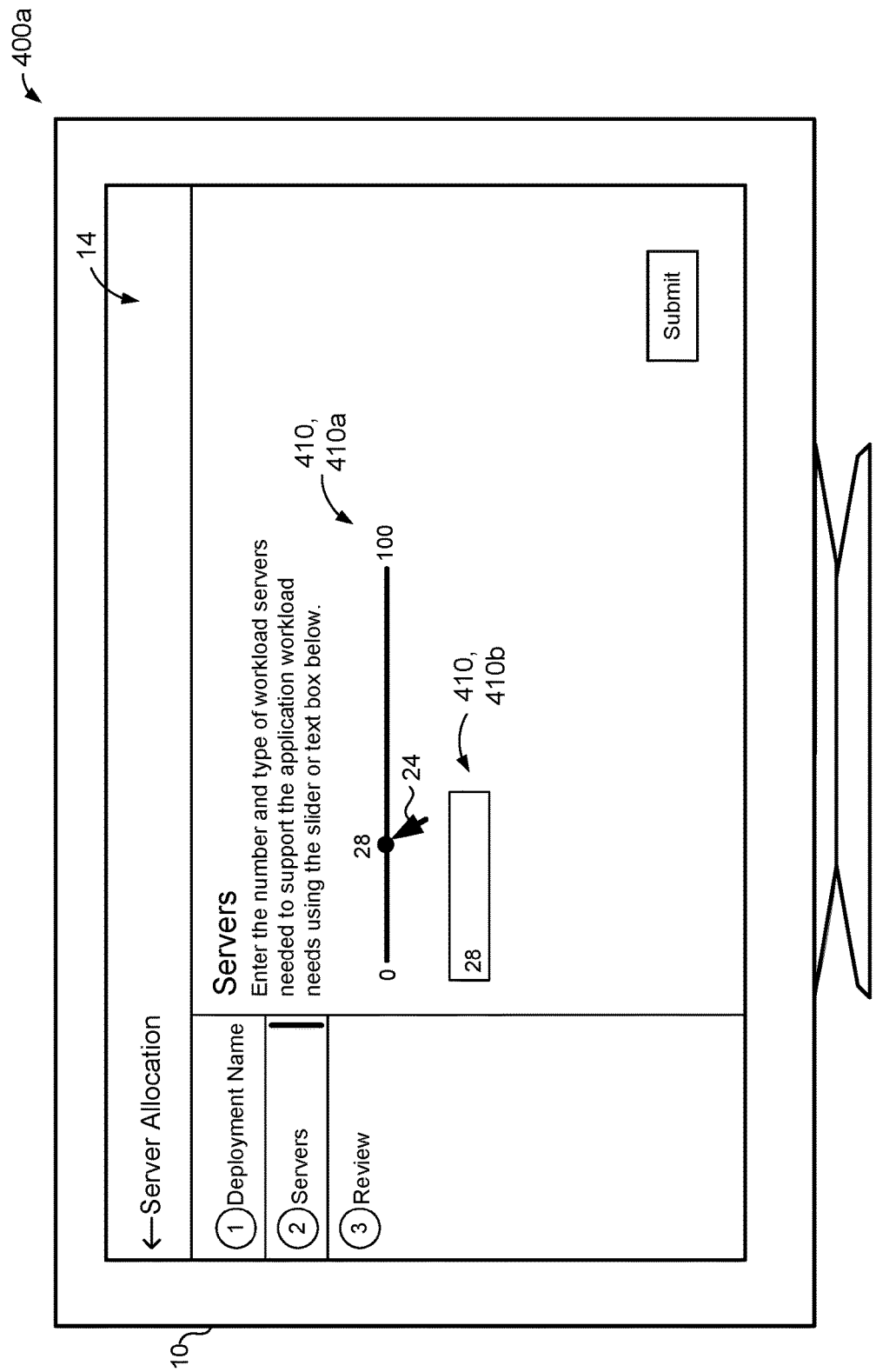
FIGS. 4A-4C are schematic views of an exemplary graphical user interface (GUI) executing on a user device for managing cloud infrastructure.

Referring now to FIG. 4A, a schematic view 400a includes an exemplary user device 10 executing the GUI 14. Here, the GUI 14 solicits user interactions 24 from the user 12 by providing one or more input fields 410, 410a-n. In this example, the GUI 14 provides a slider 410a and a text box 410b, however any type of input fields may be provided (e.g., radio buttons, checkboxes, list selections, drop-down boxes, voice input, etc.). Specifically, in this example, the user 12 selects, via a user interaction 24, that a deployment should include 28 servers by adjusting the slider 410a. The GUI 14 may solicit any number of user interactions 24 from the user 12 to gather all of the abstract configuration data 22 required to generate the modification request 20. For example, the GUI 14 solicits identifiers, user credentials (e.g., usernames, passwords, etc.), approvers, etc.

Figure 4B:
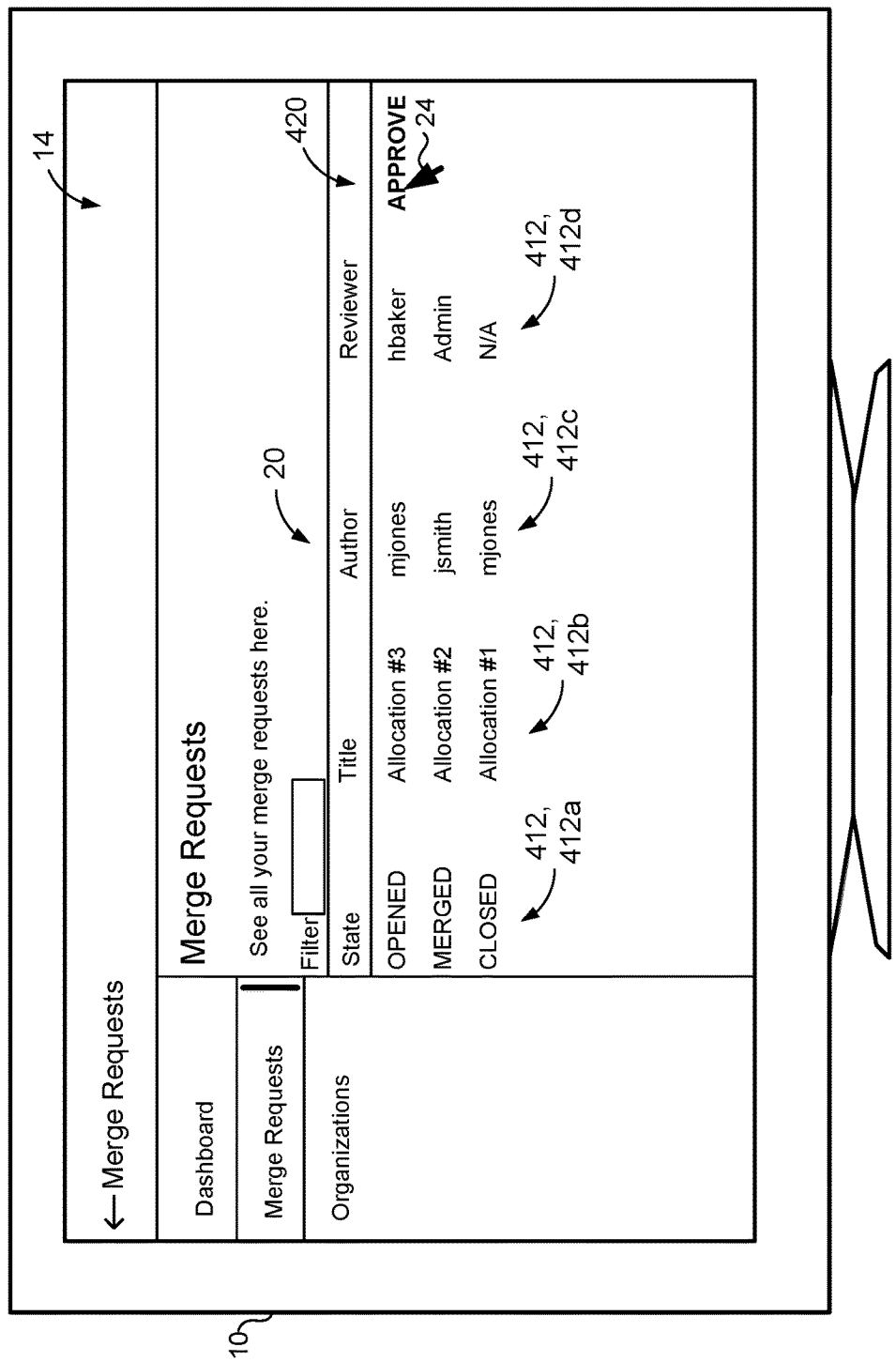

Referring now to FIG. 4B, a schematic view 400*b* includes another exemplary user device 10 executing the GUI 14. Here, the GUI 14 displays pending and closed modification requests 20 (i.e., "merge requests"). For example, the GUI 14 displays any number of modification statuses 412. Here, the modification statuses 412 include a state 412, 412*a* (e.g., opened or pending, merged or completed, and/or closed or denied), a title 412, 412*b*, an author 412, 412*c* of the modification request 20, and a reviewer 412, 412*d* (i.e., an approver) of the modification request 20. The GUI 14 may allow the user 12 to search, filter, and/or view the details of modification requests 20. In some implementations, the GUI 14 allows the user 12 to approve one or more modification requests 20. Here, via a user interaction 24, the user 12 may interact with an approval user input 420 (e.g., a button). Interaction with the approval user input 420 generates the approval response 314*a* (FIG. 3), allowing the SCM manager 300 to merge the updated configuration files 152 into the repository via the SCMS 150. In some examples, the user 12 selects any of the modification requests 20 to obtain additional details of the respective modification request 20.

Figure 4C:
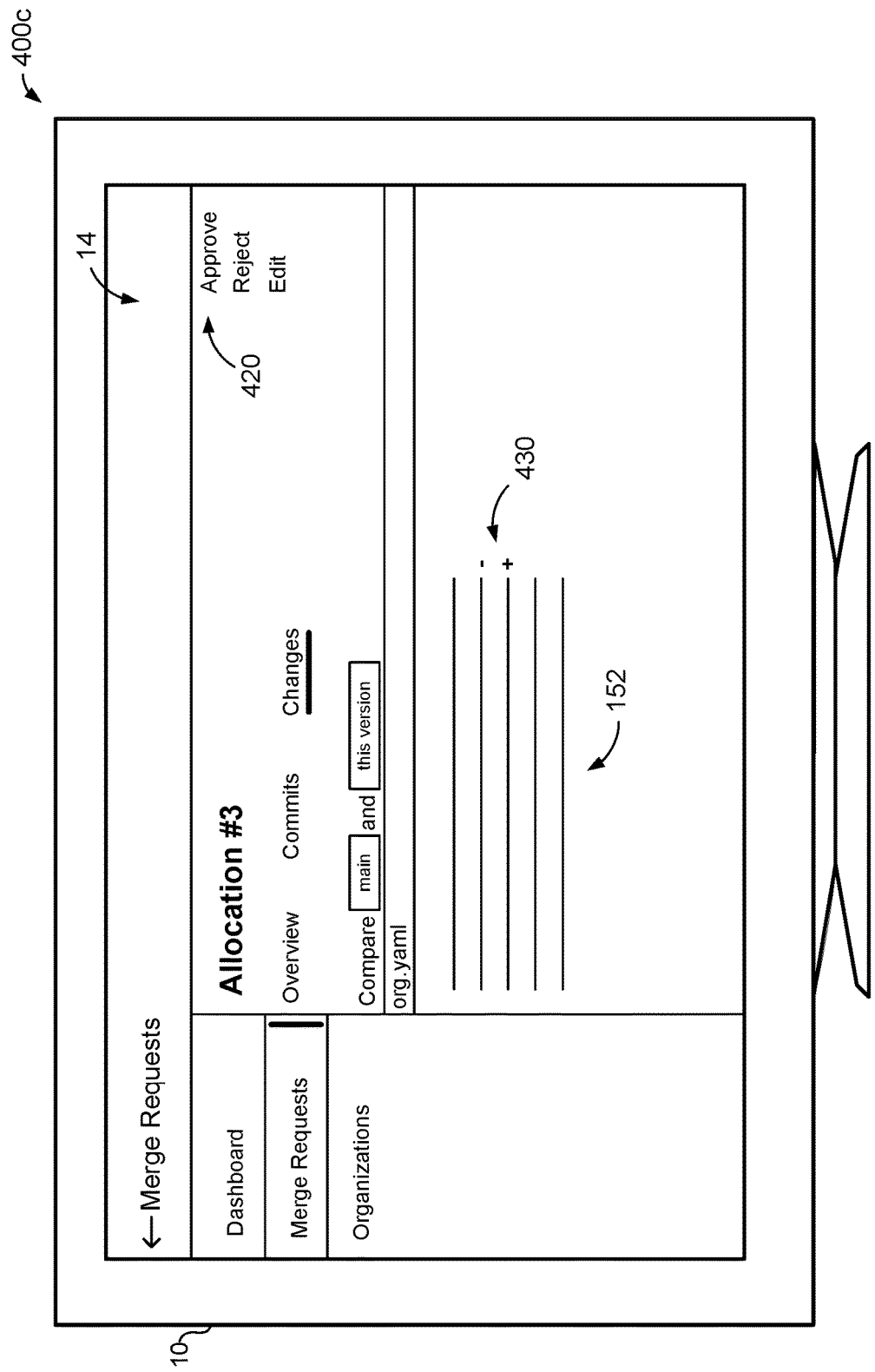

Referring now to FIG. 4C, a schematic view 400*c* includes the user device 10 executing the GUI 14 of FIG. 4B. Here, the user 12 has selected the modification request 20 titled "Allocation #3" and the GUI 14 has responded by displaying a detailed view of the modification request 20. The GUI 14 may provide various different views with different types and levels of details (e.g., an overview view, a commits view, and a changes view). Here, a changes view includes an approval request 312 that includes a difference 430 between the configuration file 152 prior to updating with the new configuration commands 210 (i.e., the original configuration file 152) and the updated configuration file 152. For example, the difference highlights to the user 12 any added, deleted, and/or changed lines, allowing the user 12 to quickly review the specific changes to the configuration file 152 prior to approving, denying, or editing the modification request 20. After reviewing the changes to the configuration file 152, the user 12 may dispose of the modification request 20 by selecting the approval user input 420, rejecting the modification request 20, or modifying the modification request 20. In some implementations, the user 12 modifies the modification request 20 by editing the configuration file 152 directly or changing other parameters of the modification request 20 (e.g., changing the name, changing the approver, etc.). The modified modification request 20 may require approval from another user 12 (e.g., the original author of the modification request 20 or a third user 12).

Thus, the cloud infrastructure manager 200, in some implementations, automatically generates configuration changes from one or more user actions (i.e., user interactions 24 with the GUI 14 executing on the user device 10). For example, a user 12 provides credentials to the cloud infrastructure manager 200 and then performs one or more operation (e.g. clicking a creation button) on the GUI 14. This causes the user device 10 to generate a modification request 20 (e.g., to a gateway server or the like). The cloud infrastructure manager 200, in response to receiving the modification request 20, generates or updates one or more configuration files 152. After the configuration file(s) 152 are created or updated, the cloud infrastructure manager 200, in some examples, generates a merge request for the SCMS 150 that includes the generated/updated configuration files 152.

In some examples, the cloud infrastructure manager 200 provides an approval process and source control management as a single source of truth for configuration management. For example, an administrator provides credentials to the cloud infrastructure manager 200 in order to view all modification requests 20 that have been created. In addition, with proper permissions, the administrator may review, approve, and/or reject the modification requests 20. When the administrator (or other approver) approves a modification request 20, the cloud infrastructure manager 200, in some examples, performs a "dry-run" of the new or updated configuration 152. When the dry-run succeeds, the cloud infrastructure manager 200 may notify the SCMS 150. The SCMS 150 merges the updates to, for example, a main branch for the configuration file(s) 152. When the dry-run fails, the cloud infrastructure manager 200 may instead send a notification of the failure to the user 12 via the GUI 14.

In some implementations, the cloud infrastructure manager 200 applies the configuration changes (i.e., a configuration synchronization). For example, after a modification request 20 is merged to the main branch successfully, the cloud infrastructure manager 200 applies the generated configuration to the cloud infrastructure 50 (e.g., a container orchestration system) automatically.

Optionally, a user 12 creates and/or updates cloud resources/infrastructure 50 using the GUI 14 executing on the user device 10. For example, the user 12 creates a fleet. In this example, the cloud infrastructure manager 200 automatically transforms user actions (i.e., the user interactions 24 between the user 12 and the GUI 14) to code changes in the configuration files 152. One or more other users 12 may be required to approve the configuration changes before the configuration changes are merged into the main branch of the SCMS 150. After approval (when required), the code changes merge and become the source of truth for the cloud infrastructure 50. In some examples, the cloud infrastructure manager 200 initiates a configuration synchronization pipeline before applying the configuration changes. The infrastructure code (translated from the user actions) may be cloned to create more cloud resources (e.g., fleets in this example).

Figure 5:
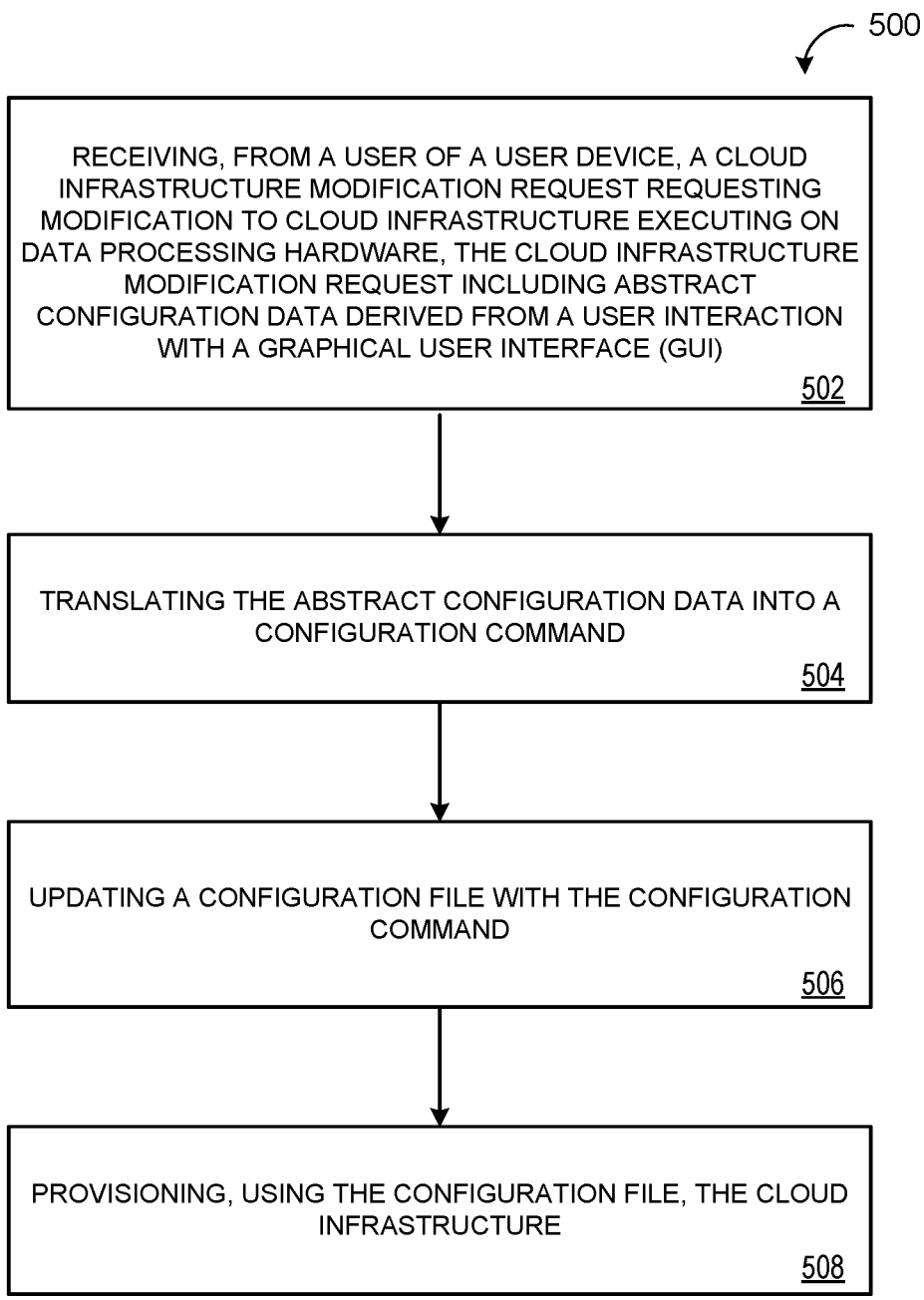
FIG. 5 a flowchart of an example arrangement of operations for a method of managing cloud infrastructure.

FIG. 5 is a flowchart of an exemplary arrangement of operations for a computer-implemented method 500 of managing cloud infrastructure. The method 500, when executed by data processing hardware 144, causes the data processing hardware 144 to perform operations. The method 500, at operation 502, includes receiving, from a user 12 of a user device 10, a cloud infrastructure modification request 20 requesting modification to cloud infrastructure 50 executing on the data processing hardware 144. The cloud infrastructure modification request 20 includes abstract configuration data 22 derived from a user interaction 24 with a GUI 14 (e.g., executing on the user device 10). The method 500, at operation 505, includes translating the abstract configuration data 22 into a configuration command 210 and, at operation 506, updating a configuration file 152 with the configuration command 210. The configuration file 152 may include one or more cloud infrastructure specifications 154 for the cloud infrastructure 50 and may be controlled by a source control management system 150. The method 500, at operation 508, includes provisioning, using the updated configuration file 152U, the cloud infrastructure 50.

Figure 6:
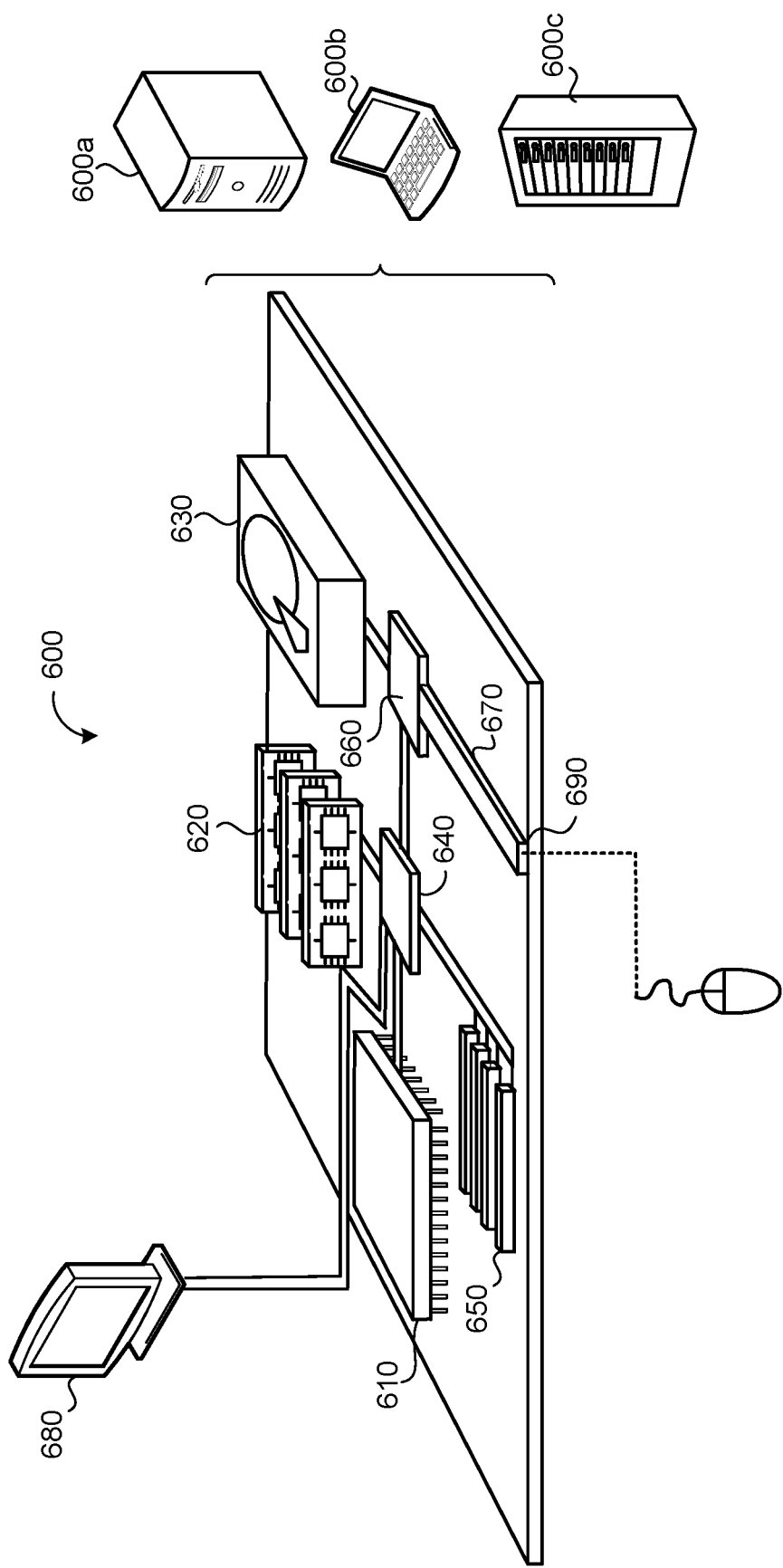
FIG. 6 is a schematic view of an example computing device that may be used to implement the systems and methods described herein.

FIG. 6 is a schematic view of an example computing device 600 that may be used to implement the systems and methods described in this document. The computing device 600 is intended to represent various forms of digital computers, such as laptops, desktops, workstations, personal digital assistants, servers, blade servers, mainframes, and other appropriate computers. The components shown here, their connections and relationships, and their functions, are meant to be exemplary only, and are not meant to limit implementations of the inventions described and/or claimed in this document.

The computing device 600 includes a processor 610, memory 620, a storage device 630, a high-speed interface/controller 640 connecting to the memory 620 and high-speed expansion ports 650, and a low speed interface/controller 660 connecting to a low speed bus 670 and a storage device 630. Each of the components 610, 620, 630, 640, 650, and 660, are interconnected using various busses, and may be mounted on a common motherboard or in other manners as appropriate. The processor 610 can process instructions for execution within the computing device 600, including instructions stored in the memory 620 or on the storage device 630 to display graphical information for a graphical user interface (GUI) on an external input/output device, such as display 680 coupled to high speed interface 640. In other implementations, multiple processors and/or multiple buses may be used, as appropriate, along with multiple memories and types of memory. Also, multiple computing devices 600 may be connected, with each device providing portions of the necessary operations (e.g., as a server bank, a group of blade servers, or a multi-processor system).

The memory 620 stores information non-transitorily within the computing device 600. The memory 620 may be a computer-readable medium, a volatile memory unit(s), or non-volatile memory unit(s). The non-transitory memory 620 may be physical devices used to store programs (e.g., sequences of instructions) or data (e.g., program state information) on a temporary or permanent basis for use by the computing device 600. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs). Examples of volatile memory include, but are not limited to, random access memory (RAM), dynamic random access memory (DRAM), static random access memory (SRAM), phase change memory (PCM) as well as disks or tapes.

The storage device 630 is capable of providing mass storage for the computing device 600. In some implementations, the storage device 630 is a computer-readable medium. In various different implementations, the storage device 630 may be a floppy disk device, a hard disk device, an optical disk device, or a tape device, a flash memory or other similar solid state memory device, or an array of devices, including devices in a storage area network or other configurations. In additional implementations, a computer program product is tangibly embodied in an information carrier. The computer program product contains instructions that, when executed, perform one or more methods, such as those described above. The information carrier is a computer- or machine-readable medium, such as the memory 620, the storage device 630, or memory on processor 610.

The high speed controller 640 manages bandwidth-intensive operations for the computing device 600, while the low speed controller 660 manages lower bandwidth-intensive operations. Such allocation of duties is exemplary only. In some implementations, the high-speed controller 640 is coupled to the memory 620, the display 680 (e.g., through a graphics processor or accelerator), and to the high-speed expansion ports 650, which may accept various expansion cards (not shown). In some implementations, the low-speed controller 660 is coupled to the storage device 630 and a low-speed expansion port 690. The low-speed expansion port 690, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The computing device 600 may be implemented in a number of different forms, as shown in the figure. For example, it may be implemented as a standard server 600*a* or multiple times in a group of such servers 600*a*, as a laptop computer 600*b*, or as part of a rack server system 600*c*.

Various implementations of the systems and techniques described herein can be realized in digital electronic and/or optical circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

A software application (i.e., a software resource) may refer to computer software that causes a computing device to perform a task. In some examples, a software application may be referred to as an "application," an "app," or a "program." Example applications include, but are not limited to, system diagnostic applications, system management applications, system maintenance applications, word processing applications, spreadsheet applications, messaging applications, media streaming applications, social networking applications, and gaming applications.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, non-transitory computer readable medium, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

The processes and logic flows described in this specification can be performed by one or more programmable processors, also referred to as data processing hardware, executing one or more computer programs to perform functions by operating on input data and generating output. The processes and logic flows can also be performed by special purpose logic circuitry, e.g., an FPGA (field programmable gate array) or an ASIC (application specific integrated circuit). Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, one or more aspects of the disclosure can be implemented on a computer having a display device, e.g., a CRT (cathode ray tube), LCD (liquid crystal display) monitor, or touch screen for displaying information to the user and optionally a keyboard and a pointing device, e.g., a mouse or a trackball, by which the user can provide input to the computer. Other kinds of devices can be used to provide interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

A number of implementations have been described. Nevertheless, it will be understood that various modifications may be made without departing from the spirit and scope of the disclosure. Accordingly, other implementations are within the scope of the following claims.

What is claimed is:

1. A system comprising:
   data processing hardware; and
   memory hardware in communication with the data processing hardware, the memory hardware storing instructions that when executed on the data processing hardware cause the data processing hardware to perform operations comprising:
   receiving, from a user of a user device, a cloud infrastructure modification request requesting modification to cloud infrastructure executing on the data processing hardware, the cloud infrastructure modification request comprising abstract configuration data derived from a user interaction with a graphical user interface (GUI);
   translating the abstract configuration data into a configuration command, the configuration command describing a configuration of the cloud infrastructure;
   updating a configuration file with the configuration command; and
   provisioning, using the updated configuration file, the cloud infrastructure.

2. The system of claim 1, wherein the operations further comprise:
   after updating the configuration file with the configuration command, generating an approval request requesting approval of the update to the configuration file from a second user of a second user device; and
   prior to provisioning the cloud infrastructure, receiving, from the second user device, an approval response approving the update to the configuration file.

3. The system of claim 2, wherein the operations further comprise:
   receiving, from the user of the user device, a second cloud infrastructure modification request requesting modification to the cloud infrastructure, the second cloud infrastructure modification request comprising second abstract configuration data derived from a second user interaction with the GUI executing on the user device;
   translating the second abstract configuration data into a second configuration command;
   updating the configuration file with the second configuration command;
   generating a second approval request requesting approval of the update to the configuration file from the second user of the second user device;
   receiving, from the second user device, a rejection response rejecting the update to the configuration file; and
   transmitting, to the user device, a notification comprising the rejection response.

4. The system of claim 3, wherein the GUI executes on the user device.

5. The system of claim 3, wherein the configuration file:
   comprises one or more cloud infrastructure specifications for the cloud infrastructure; and
   is controlled by a source control management system.

6. The system of claim 2, wherein the operations further comprise:
   receiving, from the user of the user device, a second cloud infrastructure modification request requesting modification to the cloud infrastructure, the second cloud infrastructure modification request comprising second abstract configuration data derived from a second user interaction with the GUI executing on the user device;
   translating the second abstract configuration data into second configuration command;
   determining a merge conflict between the second configuration command and existing configuration commands of the configuration file; and
   transmitting, to the user device, a notification comprising the merge conflict.

7. The system of claim 2, wherein the approval request comprises a difference between the configuration file prior to updating and the configuration file after updating.

8. The system of claim 1, wherein the operations further comprise, prior to updating the configuration file with the configuration command, retrieving the configuration file from a source control management system.

9. The system of claim 8, wherein updating the configuration file comprises merging the configuration command with the configuration file using the source control management system.

10. The system of claim 1, wherein, after provisioning the cloud infrastructure, the operations further comprise:
    receiving, from a second user of a second user device, updated configuration commands;
    updating the configuration file with the updated configuration commands;
    provisioning, using the configuration file, the cloud infrastructure; and sending, to the user device, a GUI update command, the GUI update command, when executed by the user device causing the user device to display, on the GUI executing on the user device, visual elements representing the updated configuration commands.

11. The system of claim 10, wherein the updated configuration commands are derived from updates the second user made to a copy of the configuration file stored at the second user device.

12. The system of claim 1, wherein the configuration file comprises Infrastructure as Code (IaC).

13. A computer-implemented method executed by data processing hardware that causes the data processing hardware to perform operations comprising:
- receiving, from a user of a user device, a cloud infrastructure modification request requesting modification to cloud infrastructure executing on the data processing hardware, the cloud infrastructure modification request comprising abstract configuration data derived from a user interaction with a graphical user interface (GUI);
- translating the abstract configuration data into a configuration command, the configuration command describing a configuration of the cloud infrastructure;
- updating a configuration file with the configuration command; and
- provisioning, using the updated configuration file, the cloud infrastructure.

14. The method of claim 13, wherein the operations further comprise:
- after updating the configuration file with the configuration command, generating an approval request requesting approval of the update to the configuration file from a second user of a second user device; and
- prior to provisioning the cloud infrastructure, receiving, from the second user device, an approval response approving the update to the configuration file.

15. The method of claim 14, wherein the operations further comprise:
- receiving, from the user of the user device, a second cloud infrastructure modification request requesting modification to the cloud infrastructure, the second cloud infrastructure modification request comprising second abstract configuration data derived from a second user interaction with the GUI executing on the user device;
- translating the second abstract configuration data into a second configuration command;
- updating the configuration file with the second configuration command;
- generating a second approval request requesting approval of the update to the configuration file from the second user of the second user device;
- receiving, from the second user device, a rejection response rejecting the update to the configuration file; and
- transmitting, to the user device, a notification comprising the rejection response.

16. The method of claim 14, wherein the operations further comprise:
- receiving, from the user of the user device, a second cloud infrastructure modification request requesting modification to the cloud infrastructure, the second cloud infrastructure modification request comprising second abstract configuration data derived from a second user interaction with the GUI executing on the user device;
- translating the second abstract configuration data into second configuration command;
- determining a merge conflict between the second configuration command and existing configuration commands of the configuration file; and
- transmitting, to the user device, a notification comprising the merge conflict.

17. The method of claim 14, wherein the approval request comprises a difference between the configuration file prior to updating and the configuration file after updating.

18. The method of claim 13, wherein the operations further comprise, prior to updating the configuration file with the configuration command, retrieving the configuration file from a source control management system.

19. The method of claim 18, wherein updating the configuration file comprises merging the configuration command with the configuration file using the source control management system.

20. The method of claim 13, wherein, after provisioning the cloud infrastructure, the operations further comprise:
- receiving, from a second user of a second user device, updated configuration commands;
- updating the configuration file with the updated configuration commands;
- provisioning, using the configuration file, the cloud infrastructure; and
- sending, to the user device, a GUI update command, the GUI update command, when executed by the user device causing the user device to display, on the GUI executing on the user device, visual elements representing the updated configuration commands.

21. The method of claim 20, wherein the updated configuration commands are derived from updates the second user made to a copy of the configuration file stored at the second user device.

22. The method of claim 13, wherein the configuration file comprises Infrastructure as Code (IaC).

23. The method of claim 13, wherein the GUI executes on the user device.

24. The method of claim 13, wherein the configuration file:
- comprises one or more cloud infrastructure specifications for the cloud infrastructure; and
- is controlled by a source control management system.

* * * * *